(12) United States Patent
Doti et al.

(10) Patent No.: US 11,599,919 B2
(45) Date of Patent: Mar. 7, 2023

(54) INFORMATION EXCHANGE USING A DATABASE SYSTEM

(71) Applicant: Salesforce.com, Inc., San Francisco, CA (US)

(72) Inventors: Adam McCormick Doti, Petaluma, CA (US); Carly Berman, San Francisco, CA (US); Jennifer Sacks, San Francisco, CA (US); Daniel Everett Jemiolo, San Francisco, CA (US); Kristen Engelhardt, San Francisco, CA (US)

(73) Assignee: salesforce.com, inc, San Francisco, CA (US)

( * ) Notice: Subject to any disclaimer, the term of this patent is extended or adjusted under 35 U.S.C. 154(b) by 833 days.

(21) Appl. No.: 16/214,555

(22) Filed: Dec. 10, 2018

(65) Prior Publication Data

US 2020/0098019 A1 Mar. 26, 2020

Related U.S. Application Data

(60) Provisional application No. 62/735,324, filed on Sep. 24, 2018.

(51) Int. Cl.
| | | |
|---|---|---|
| *G06Q 30/0282* | (2023.01) | |
| *G06Q 30/016* | (2023.01) | |
| *G06F 8/77* | (2018.01) | |
| *G06F 3/0482* | (2013.01) | |
| *G06K 9/62* | (2022.01) | |
| *G06F 8/10* | (2018.01) | |

(Continued)

(52) U.S. Cl.
CPC ....... *G06Q 30/0282* (2013.01); *G06F 3/0482* (2013.01); *G06F 8/10* (2013.01); *G06F 8/77* (2013.01); *G06K 9/6267* (2013.01); *G06Q 30/01* (2013.01); *G06Q 30/016* (2013.01); *G06Q 30/0201* (2013.01); *H04L 67/535* (2022.05); *G06Q 50/01* (2013.01)

(58) Field of Classification Search
CPC .............. G06Q 30/0282; G06Q 30/01; G06Q 30/0201; G06Q 30/016; G06Q 50/01; G06F 8/77; G06F 3/0482; G06F 8/10; H04L 67/22; H04L 67/535; G06K 9/6267; H04W 4/60; H04W 4/50
See application file for complete search history.

(56) References Cited

U.S. PATENT DOCUMENTS

| | | | | |
|---|---|---|---|---|
| 6,161,112 A | * | 12/2000 | Cragun | G06F 16/9577 715/251 |
| 8,675,912 B2 | * | 3/2014 | Caduff | H04W 4/185 382/103 |

(Continued)

FOREIGN PATENT DOCUMENTS

WO WO-2013095348 A1 * 6/2013 ......... G06F 16/9535

*Primary Examiner* — Alexandru Cirnu
(74) *Attorney, Agent, or Firm* — Kwan & Olynick LLP

(57) ABSTRACT

An information exchange environment may be maintained. The information exchange environment may be configurable to allow users of an application or service to exchange suggestion data with product development. A user interface may be displayed on a device of a first user of the application or service. A request from the first user to submit first suggestion data may be processed. The first suggestion data may be classified. The first suggestion data may be provided to a first product development entity.

19 Claims, 11 Drawing Sheets

(51) Int. Cl.
　　　*G06Q 30/01*　　　(2023.01)
　　　*G06Q 30/0201*　　(2023.01)
　　　*H04L 67/50*　　　(2022.01)
　　　*G06Q 50/00*　　　(2012.01)

(56) References Cited

U.S. PATENT DOCUMENTS

| | | | |
|---|---|---|---|
| 8,805,921 B2 * | 8/2014 | Deng | H04L 41/145 |
| | | | 709/201 |
| 8,954,431 B2 * | 2/2015 | Okazaki | G06F 3/04815 |
| | | | 707/732 |
| 2014/0047413 A1 * | 2/2014 | Sheive | G06F 8/30 |
| | | | 717/110 |
| 2015/0220312 A1 | 8/2015 | Jemiolo | |
| 2015/0277727 A1 | 10/2015 | Jemiolo et al. | |
| 2015/0278029 A1 | 10/2015 | Jemiolo | |
| 2016/0104067 A1 | 4/2016 | Xu et al. | |
| 2016/0140503 A1 | 5/2016 | Jemiolo | |
| 2016/0224320 A1 | 8/2016 | Jemiolo et al. | |
| 2016/0246467 A1 | 8/2016 | Jemiolo et al. | |
| 2016/0246615 A1 | 8/2016 | Jemiolo et al. | |
| 2017/0109393 A1 | 4/2017 | Jemiolo et al. | |
| 2018/0047115 A1 | 2/2018 | Jemiolo et al. | |
| 2018/0253195 A1 | 9/2018 | Van Osten et al. | |

\* cited by examiner

INFORMATION EXCHANGE USING A DATABASE SYSTEM

CROSS-REFERENCE TO RELATED APPLICATIONS

This patent document claims priority to Provisional U.S. Patent Application No. 62/735,324 (A4139PROV_SFDCP006P) by Doti et al., titled "INFORMATION EXCHANGE USING A DATABASE SYSTEM", filed Sep. 24, 2018. Provisional U.S. Patent Application No. 62/735,324 is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to database systems and more specifically to information exchange using a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for implementing an information exchange environment using a database system. These drawings in no way limit any changes in form and detail that may be made by one skilled in the art without departing from the spirit and scope of the disclosed implementations.

DETAILED DESCRIPTION

Figure 1:
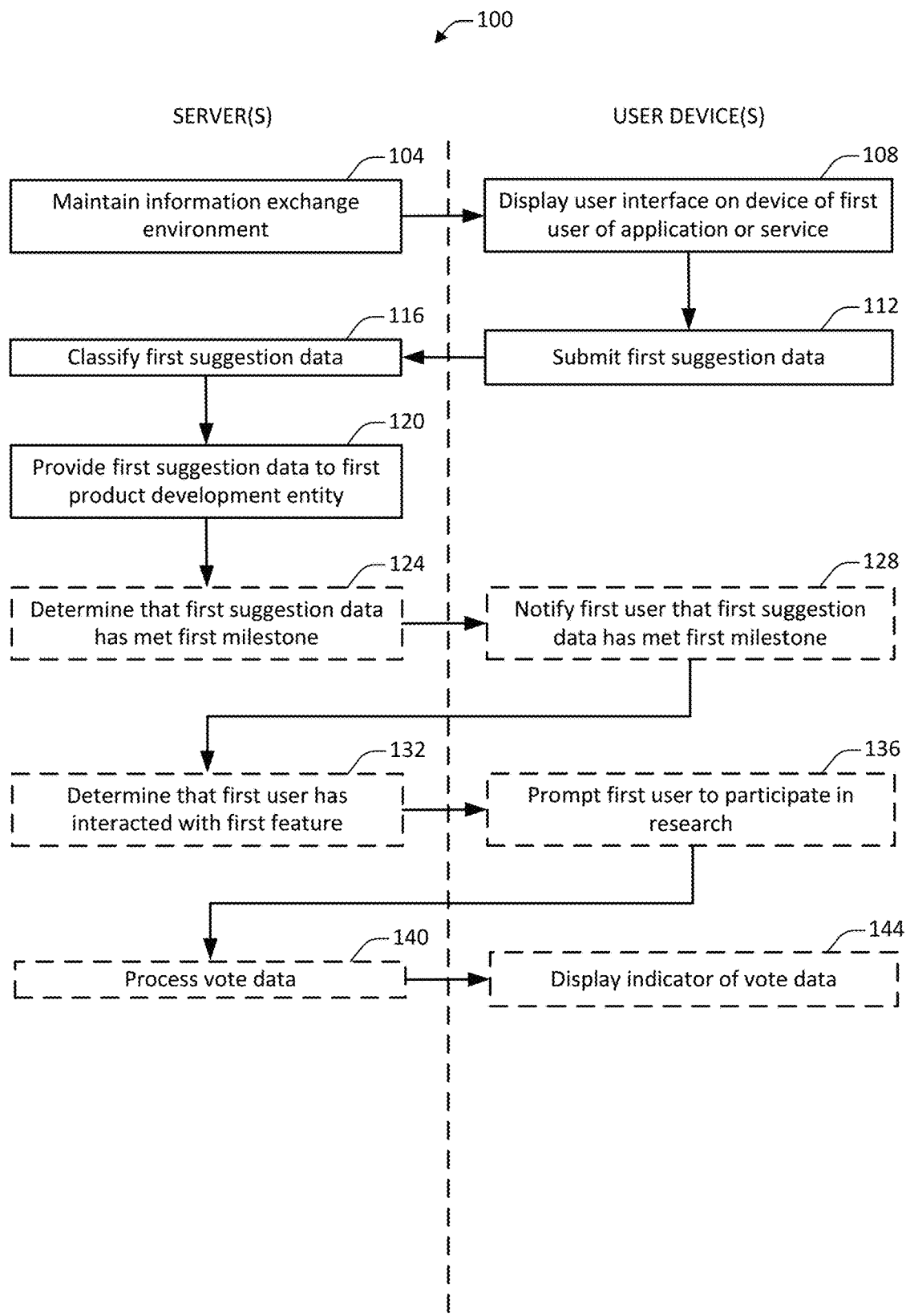
FIG. 1 shows a flowchart of an example of a method for implementing an information exchange environment using a database system, performed in accordance with some implementations.

Some implementations of the disclosed systems, apparatus, methods and computer program products are configured for exchanging information using a database system. As described in further detail below, such information exchange may include routing suggestion data from users to product managers and/or development groups of an application or service. By way of example, users may wish to make suggestions about improvement of features or addition of new features to any type of application or service such as a Customer Relationship Management (CRM) Platform, a social networking system, any type of consumer or business software, etc.

Conventional information exchange strategies generally rely on a simple suggestion box model to detrimental results. In this conventional model, users submit ideas through an electronic suggestion box. These ideas generally sit in a mailbox and may be eventually sorted by a human. Such strategies often lead to overwhelmed product managers tasked with sorting an inordinate number of suggestions and frustrated customers who feel ignored. Further, many good ideas go unnoticed. By way of illustration, Persuasion Sales, a provider of cloud-based sales solutions, is implementing a new CRM platform. Anne, the Chief Executive Officer (CEO) of Persuasion Sales, employs a conventional information exchange strategy where customers can submit suggestions via an electronic suggestion box. A customer can type his or her suggestion in a suggestion box and click a submit button, at which point his or her suggestion is sent to Wentworth. Wentworth is tasked with reading suggestions and sending them to appropriate product managers and/or product development groups in charge of different aspects of the CRM platform. Unfortunately, more than 40,000 customers submit suggestions in the weeks following the launch of the new CRM platform. Wentworth is completely overwhelmed and unable to route most of the suggestions to the appropriate product managers and/or product development groups, causing immediate backlash from the Persuasion Sales customer base who feel unheard. Furthermore, Harville, an experienced software engineer and Persuasion Sales customer, submits a suggestion with the potential to revolutionize the Persuasion Sales platform. Unfortunately, Harville's suggestion gets lost in the sea of customer suggestions and goes completely unnoticed.

By contrast, some of the disclosed techniques can be used to improve information exchange, remedying many of the problems described in the preceding paragraph. Returning to the above example, Anne chooses to implement the disclosed techniques. Provision of suggestions may be made easy by allowing customers to submit suggestions directly in the user interface of the CRM platform. As discussed further below, each time a customer submits a suggestion, the suggestion may be automatically classified and routed to the appropriate product manager and/or product development group.

In some implementations, customers can vote on others' suggestions, so that product managers can prioritize their time by reading popular suggestions first. Each customer may have a limited number of votes to express preferences about suggestion data, preventing artificial inflation of the popularity of ideas. In this framework, Harville's suggestion receives many votes, is quickly noticed by the product team, and is rapidly implemented in the next version of the platform.

Figure 2:
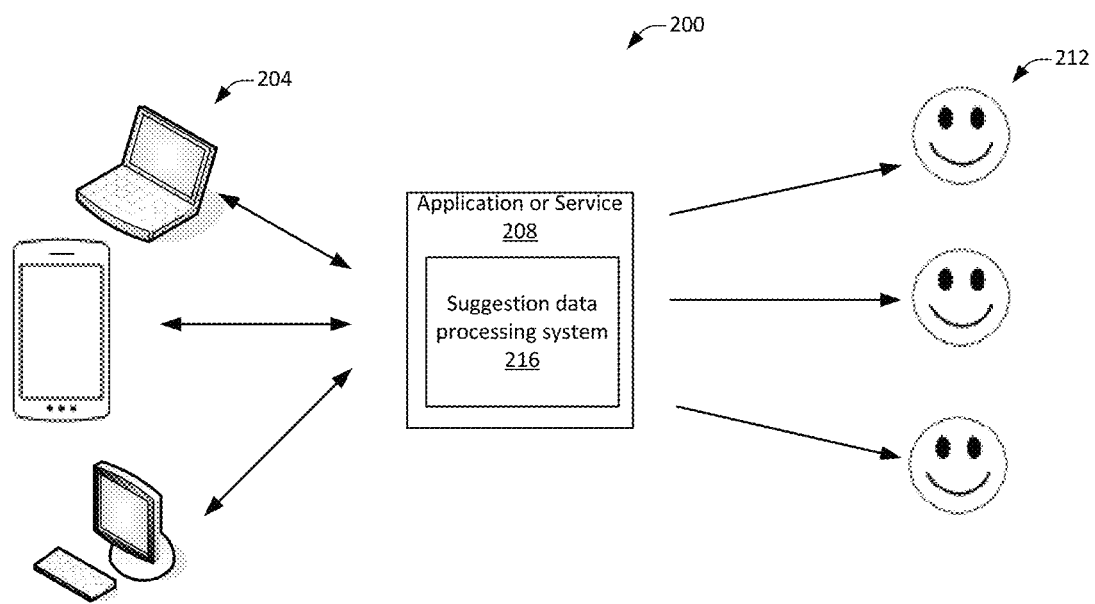
FIG. 2 shows a block diagram of an example of an information exchange environment, in accordance with some implementations.
Figure 3:
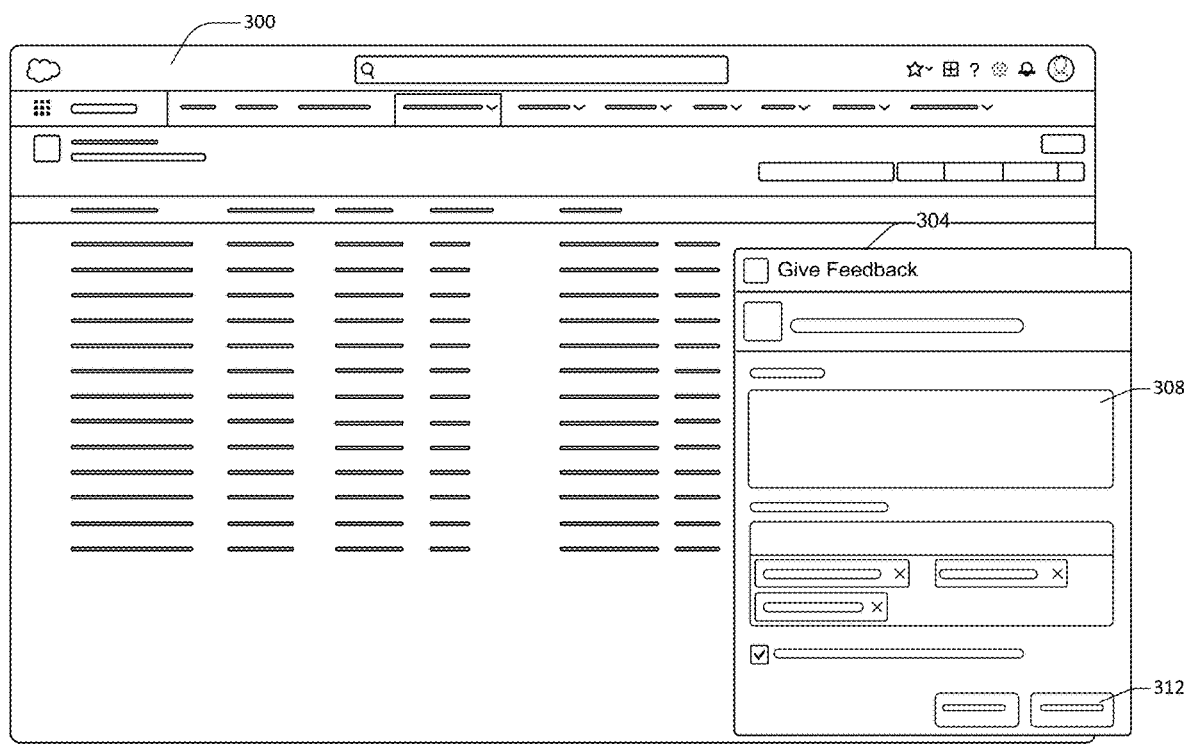
FIGS. 3-8 show examples of Graphical User Interfaces (GUIs), in accordance with some implementations.

FIG. 1 shows a flowchart of an example of a method for implementing an information exchange environment using a database system, performed in accordance with some implementations. FIG. 2 shows a block diagram of an example of an information exchange environment, in accordance with some implementations. FIGS. 3-8 show examples of Graphical User Interfaces (GUIs), in accordance with some implementations.

At 104 of FIG. 1, an information exchange environment is maintained. By way of example, in information exchange environment of FIG. 2, user devices 204 interact with application or service 208. User devices 204 exchange suggestion data with entities 212 by way of suggestion information processing system 216, which operates in conjunction with the application or service 208. By way of example, as discussed below, the application or service 208 may have a user interface by which users of the user devices 204 may submit suggestion data. The suggestion data processing system 216 may process, classify, and provide such suggestion data to appropriate entities 212, as discussed further below. Such entities 212 may include the product managers and/or product development groups in charge of features of the application or service 208 that relate to suggestion data. The application or service 208 may be provided to the user devices 204 in a variety of manners such as via an on-demand computing environment, as discussed further below in the context of FIGS. 9-11. By way of example, application servers 950(1)-(N) of FIG. 9 may perform functions relating to implementation of CRM platform as well as functions relating to processing, classifying, and providing suggestion data to appropriate entities 212.

Returning to FIG. 1, at 108 a user interface of an application or service is displayed on a device of a user of the application or service. By way of example, user interface 300 of FIG. 3 may be displayed on Harville's computing device. While user interface 300 is a user interface of a CRM platform, one having skill in the art can appreciate that the disclosed techniques may be practiced in conjunction with any type of application or service such as those described above. The user interface 300 includes suggestion box 304, which allows users, such as Harville, to submit suggestion data related to the CRM platform, as described further below.

At 112 of FIG. 1, suggestion data is processed. Returning to the example of the preceding paragraph, Harville may enter suggestion data including his suggestion for improving the layout of a highlights panel of the CRM platform into text box 308 of FIG. 3. Once he has completed entry of the suggestion data, he may click or tap submit button 312 at which point the suggestion data may be processed.

Figure 4:
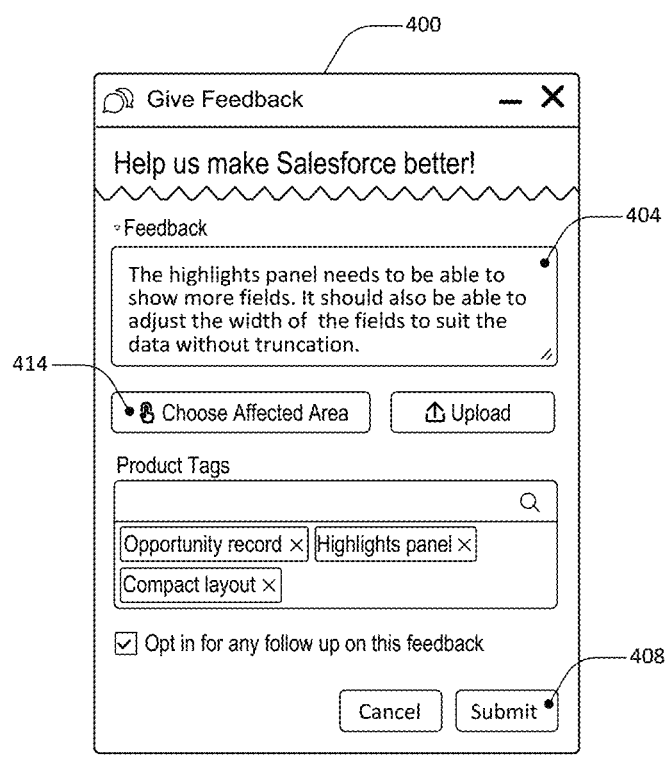
Figure 5:
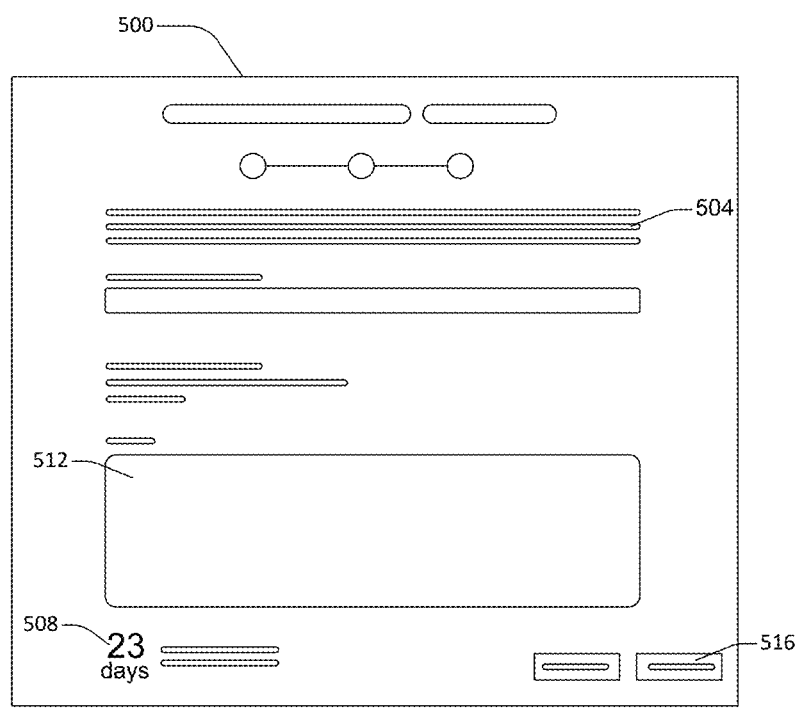
Figure 6:
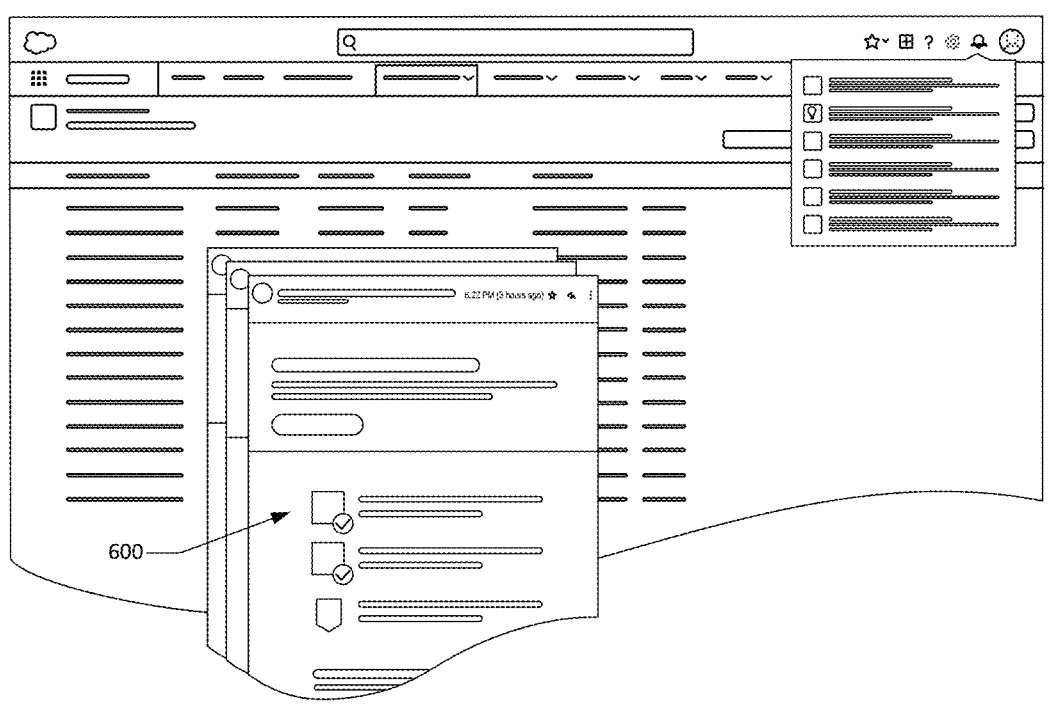
Figure 7:
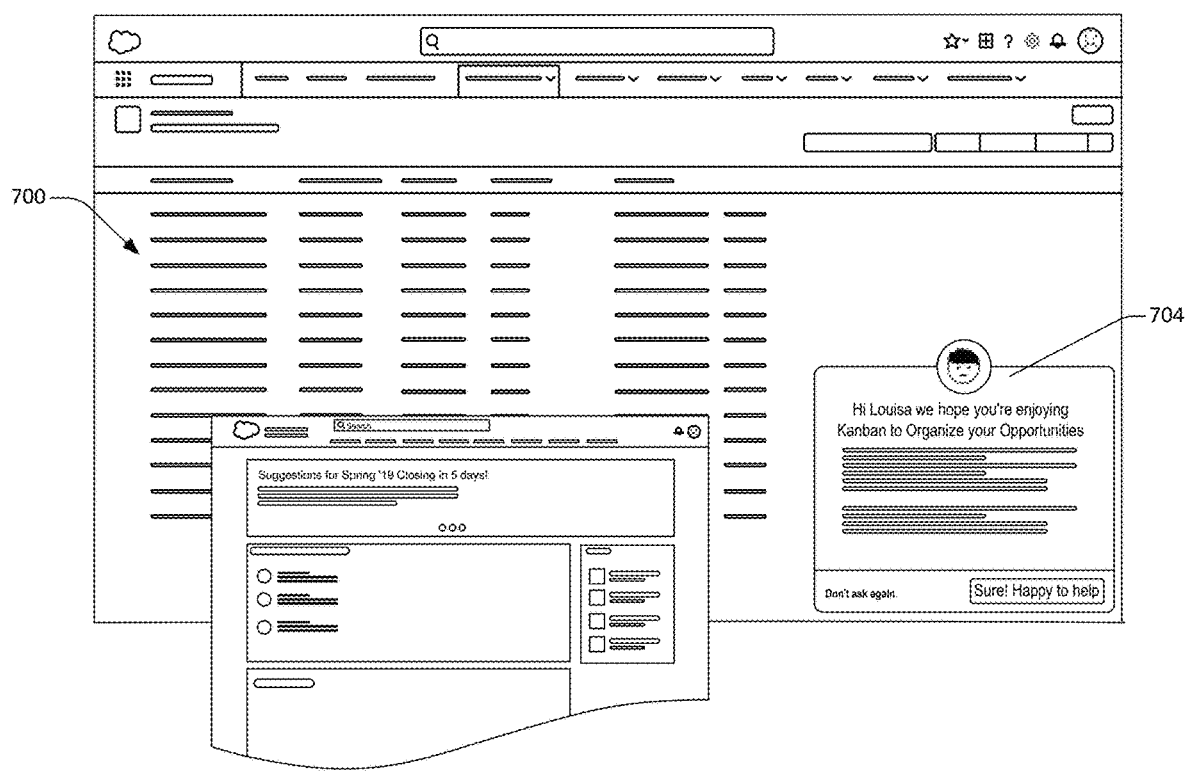
Figure 8:
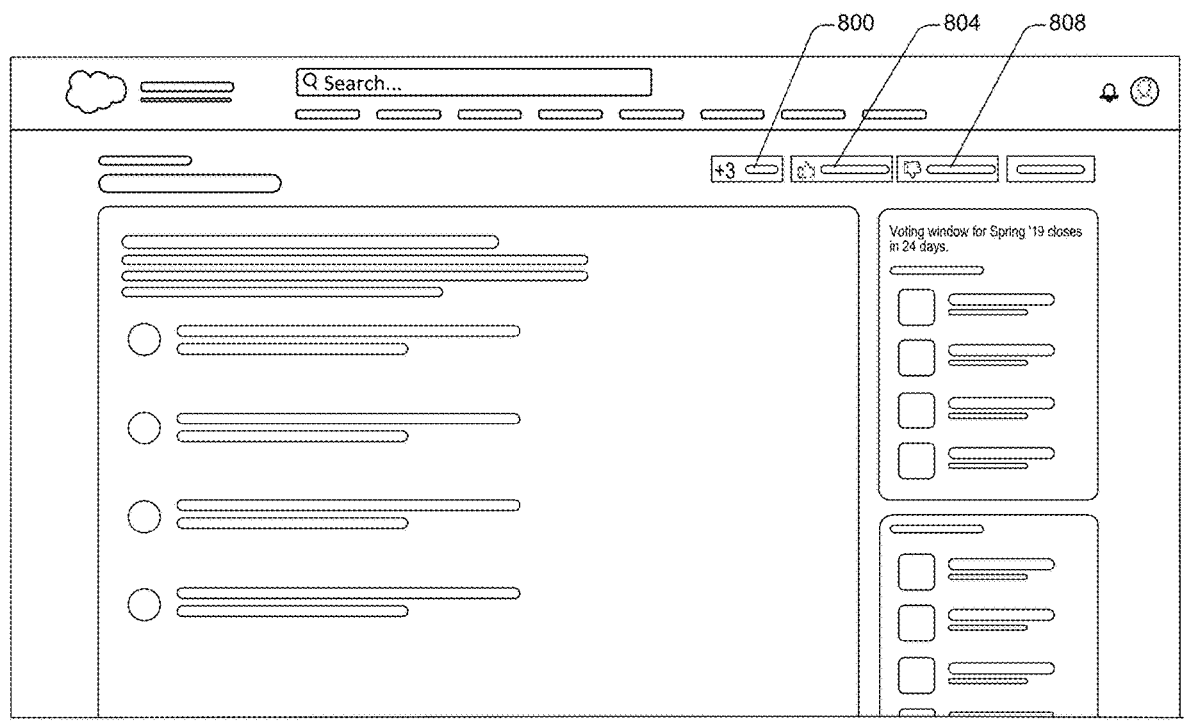

In some implementations, a user may be allowed to indicate a region of the user interface as being related to the suggestion data that he or she is submitting. By way of illustration, suggestion box 400 of FIG. 4 depicts another example of a suggestion box. Similar to the example discussed above, Harville may enter suggestion data that includes his suggestion for improving the layout of the highlights panel into text box 404. In order to indicate a region of the user interface as being related to his suggestion data, Harville may click "choose affected area button" 412. Once Harville clicks choose affected area button 412, he may be presented with the user interface of the application or service. At this point, the user interface of the application or service may be displayed on Harville's computing device in a particular mode that allows Harville to click anywhere in the user interface without affecting the application or service. As such, Harville may click on the region of the user interface in the vicinity of the highlights panel, since he is submitting suggestion data related to the highlights panel. The region where Harville clicks may be registered and may Harville's suggestion data may be automatically classified as being related to the highlights panel, as described in further detail below. Once Harville has completed entry of the suggestion data and selected the relevant region of the user interface, he may click or tap submit button 408 at which point the suggestion data may be processed.

Also or alternatively, a user may be presented with a variety of other information when he or she is submitting suggestion data. By way of example, Harville may navigate to detailed suggestion box 500 of FIG. 5. Detailed suggestion box 504 includes rules of engagement 504, which detail expectations for engagement, communications, and delivery. Detailed suggestion box 504 also includes an indicator 508, which indicates how many days are left in the product planning cycle for the product for which Harville is entering suggestion data. Similar to the example of the preceding paragraph, Harville may enter suggestion data including his suggestion for improving the layout of the highlights panel into text box 512. Once he has completed entry of the suggestion data, he may click or tap submit button 516 at which point the suggestion data may be processed by a database system.

At 116 of FIG. 1, suggestion data is classified. Suggestion data may be classified in a variety of manners. For instance, in some implementations, suggestion data may be classified based on the region of the user interface that is identified by a user when she submits her suggestion data, as described above. By way of example, Harville may click on the region of the user interface in the vicinity of the highlights panel. An algorithm may be used to automatically determine that the highlights panel is likely Harville's feature of interest (e.g., the feature Harville indicated as being related to his suggestion data) by analyzing the region of the user interface and identifying a feature or features associated with the region. Such an algorithm may function in a variety of manners; a detailed description of one such example is discussed in commonly assigned U.S. Pat. No. 9,753,703, titled "Generating identifiers for user interface elements of a web page of a web application," by Daniel Everett Jemiolo, issued on Sep. 5, 2017, and hereby incorporated by reference in its entirety and for all purposes.

In some implementations, additional information may be used to resolve uncertainty in the above-described techniques, achieving a more robust classification of suggestion data. For example, several features may exist in the same region of the user interface, resulting in an ambiguity as to which feature the user's suggestion data relates. Therefore, a variety of heuristics may be analyzed to more accurately determine the feature or features of interest to a user submitting suggestion data. Such heuristics may include a range of information such as the page location of the page being viewed by a user when she provides her suggestion data or a set of actions taken by the user to navigate to the page. By way of illustration, Harville may be viewing an accounts record page when he submits his suggestion data and clicks on the region of the user interface. The highlights panel may be accessed through the accounts record page. Similarly, the highlights panel may exist in the region on which Harville clicked. As such, the fact that Harville was viewing an accounts record page when he submitted his suggestion data may indicate that the feature of interest to Harville is the highlights panel.

Also or alternatively such heuristics may include the licenses owned by a user submitting suggestion data. By way of example, the premium analytics button may be located near the highlights panel in the region of the user interface on which Harville has clicked. However, Harville does not have a "premium license," which is required to access to the premium analytics button. Therefore, it may be determined that the feature of interest to Harville is likely the highlights panel rather than the premium analytics button, since Harville does not the premium license.

In some implementations, the automated classification of suggestion data may be validated or rejected by the user submitting the suggestion data. By way of example, after Harville's suggestion data is classified as being related to the highlights panel, Harville may be presented with a pop up stating "Based on where you clicked, it has been determined that your suggestion relates to "the highlights panel," is that what you meant? Yes or no." Harville may click "yes" if the classification is accurate and "no" if the classification of his suggestion data is inaccurate. Such user validation may be recorded and used to improve any algorithm(s) being used to classify suggestion data.

Suggestion data may be classified in a variety of other manners in addition to those described above, including simple keyword recognition, Natural Language Processing (NLP), Artificial Intelligence (AI), and/or other classification methods. By way of example, in some implementations, content of the suggestion data may be parsed. The parsed content may be analyzed and classified into categories using a variety of techniques such as frequentist or Bayesian statistical methods, a classification and regression tree (CART) model, a random forest model, or other machine learning and/or statistical methods.

At 120 of FIG. 1, the suggestion data is provided to a product development entity (e.g., a product manager and/or product development group) associated with the application or service. Provision of suggestion data to product development entities may occur in a variety of manners. By way of example, a product manager and/or product development group may be in charge of parts of the application or service that correspond to particular features. Such assignments of features to product managers and/or product development groups may be stored in a "product management database." Therefore, any suggestion data that is classified as relating to a feature may be automatically provided to the product manager and/or product development group in charge of the feature. By way of illustration, Henrietta is the product manager in charge of handling the highlights panel. As described above, Henrietta's assignment as being the product manager in charge of handling the highlights panel may be stored in the product management database. As such, once Harville's suggestion data is classified as being related to highlights panel, Harville's suggestion data may be automatically provided to Henrietta based on the assignment information stored in the product management database.

In some implementations, at 124 of FIG. 1, it is determined that suggestion data has met a milestone. For instance, a user may be notified when the status of his or her suggestion data changes such that certain milestones are met. By way of example, a user may be notified when her suggestion data has been reviewed by a product manager, when suggestion data is being officially implemented, etc. As such, when the status of suggestion data changes, e.g., moves from received to under review or from under review to pending implementation, it may be determined that the suggestion data has met a milestone.

In some implementations, at 128 of FIG. 1, a user is notified that suggestion data has met a milestone. By way of example, in response to a determination at 124 that a user's suggestion data has been reviewed by a product manager, she may receive a notification, such as notification 600 of FIG. 6, indicating that her suggestion data has been reviewed by a product manager. Receiving such notifications as suggestion data meets milestones may allow users of an application or service to understand that they are being heard by developers of the application or service.

In some implementations, at 132 of FIG. 1, it is determined that a user has interacted with a feature of the application or service. By way of example, Louisa may be organizing her opportunities page 700 of FIG. 7. Accordingly, it may be determined that Louisa has interacted with the CRM platform by organizing the opportunities page 700.

In some implementations, at 136 of FIG. 1, a user may be prompted to participate in research. For instance, when a user of an application or service interacts with a particular feature of the application or service, she may be prompted to participate in research related to the particular feature. By way of illustration, in response to the determination at 132 that Louisa has interacted with the CRM platform by organizing the opportunities page 700 of FIG. 7, Louisa may be presented with prompt 704 to participate in research related to the feature or features of the CRM platform that allow users to organize their opportunities pages.

In some implementations, at 140 of FIG. 1, vote data is processed. For example, users may indicate a positive preference of suggestion data by "voting up" the suggestion data and they may indicate a negative preference of suggestion data by "voting down" the suggestion data. By way of illustration, users may vote up Harville's suggestion by clicking or tapping vote up button 800. Similarly users may vote down Harville's suggestion data by clicking or tapping vote down button 804. The vote data for particular suggestion data may be processed, and the total vote for the particular suggestion data may be calculated by subtracting the total down votes received for the particular suggestion data from the total up votes received for the particular suggestion data.

In some implementations, at 144 of FIG. 1, an indicator of the vote data is displayed. By way of example, indicator 808 of FIG. 8 may be displayed on Harville's computing device. Indicator 808 indicates that, at the time of display, Harville's suggestion data has a vote total of +3 votes.

In some implementations, the concept of scarcity may be implemented in an information exchange environment to mitigate an over-supply of suggestion data, the popularity of which may be over-inflated through unrestricted voting. By way of example, users may only be allowed to submit suggestion data a certain number of times, e.g., 1 time, 3 times, 5 times, 10 times, etc., limiting the overall amount of suggestion data that can be submitted. Similarly, users may only be allowed to vote on suggestion data a certain number of times, e.g., 1 time, 3 times, 5 times, 10 times, etc., ameliorating the problem of popularity over-inflation caused by unrestricted voting.

Figure 9:
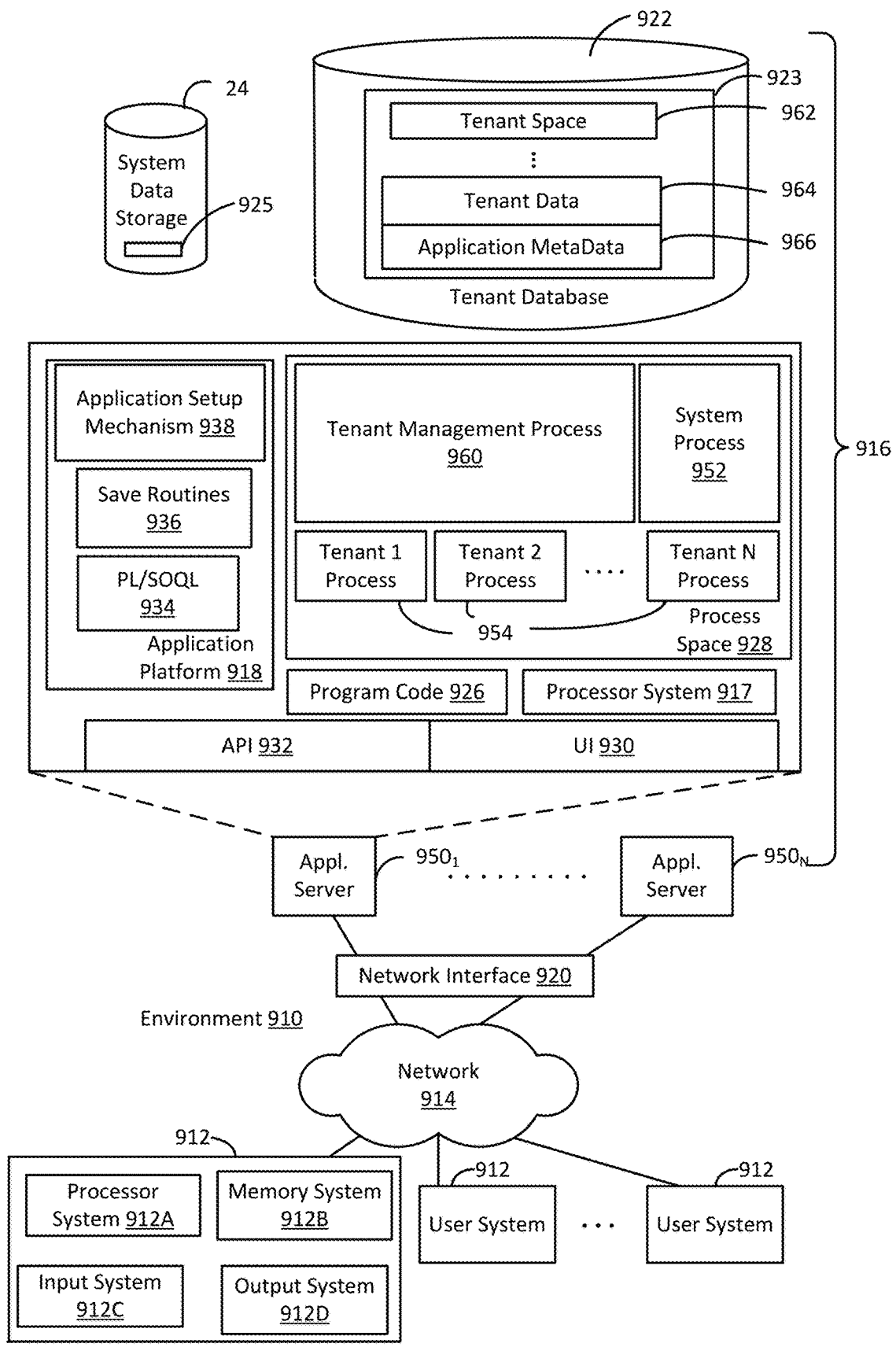
FIG. 9 shows a block diagram of an example of an environment that includes an on-demand database service configured in accordance with some implementations.

FIG. 9 shows a block diagram of an example of an environment 910 that includes an on-demand database service configured in accordance with some implementations. Environment 910 may include user systems 912, network 914, database system 916, processor system 917, application platform 918, network interface 920, tenant data storage 922, tenant data 923, system data storage 924, system data 925, program code 926, process space 928, User Interface (UI) 930, Application Program Interface (API) 932, PL/SOQL 934, save routines 936, application setup mechanism 938, application servers 950-1 through 950-N, system process space 952, tenant process spaces 954, tenant management process space 960, tenant storage space 962, user storage 964, and application metadata 966. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 916, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 916. Such applications may be developed by the database service provider or by users or third-party application developers accessing the service. Application platform 918 includes an application setup mechanism 938 that supports application developers' creation and management of applications, which may be saved as metadata into tenant data storage 922 by save routines 936 for execution by subscribers as one or more tenant process spaces 954 managed by tenant management process 960 for example. Invocations to such applications may be coded using PL/SOQL 934 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 966 for a subscriber making such an invocation. Such system processes may also manage execution of application metadata 966 as an application in a virtual machine.

In some implementations, each application server 950 may handle requests for any user associated with any organization. A load balancing function (e.g., an F5 Big-IP load balancer) may distribute requests to the application servers 950 based on an algorithm such as least-connections, round robin, observed response time, etc. Each application server 950 may be configured to communicate with tenant data storage 922 and the tenant data 923 therein, and system data storage 924 and the system data 925 therein to serve requests of user systems 912. The tenant data 923 may be divided into individual tenant storage spaces 962, which can be either a physical arrangement and/or a logical arrangement of data. Within each tenant storage space 962, user storage 964 and application metadata 966 may be similarly allocated for each user. For example, a copy of a user's most recently used (MRU) items might be stored to user storage 964. Similarly, a copy of MRU items for an entire tenant organization may be stored to tenant storage space 962. A UI 930 provides a user interface and an API 932 provides an application programming interface to system 916 resident processes to users and/or developers at user systems 912.

System 916 may implement a web-based application or service and/or an information exchange environment. For example, in some implementations, system 916 may include application servers configured to implement and execute software applications related to a CRM platform as well as functions relating to processing, classifying, and providing suggestion data to appropriate product managers and/or product development groups, as described above. The application servers may be configured to provide related data, code, forms, web pages and other information to and from user systems 912. Additionally, the application servers may be configured to store information to, and retrieve information from a database system. Such information may include related data, objects, and/or Webpage content. With a multi-tenant system, data for multiple tenants may be stored in the same physical database object in tenant data storage 922, however, tenant data may be arranged in the storage medium(s) of tenant data storage 922 so that data of one tenant is kept logically separate from that of other tenants. In such a scheme, one tenant may not access another tenant's data, unless such data is expressly shared.

Several elements in the system shown in FIG. 9 include conventional, well-known elements that are explained only briefly here. For example, user system 912 may include processor system 912A, memory system 912B, input system 912C, and output system 912D. A user system 912 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 912 to access, process and view information, pages and applications available from system 916 over network 914. Network 914 may be any network or combination of networks of devices that communicate with one another, such as any one or any combination of a LAN (local area network), WAN (wide area network), wireless network, or other appropriate configuration.

The users of user systems 912 may differ in their respective capacities, and the capacity of a particular user system 912 to access information may be determined at least in part by "permissions" of the particular user system 912. As discussed herein, permissions generally govern access to computing resources such as data objects, components, and other entities of a computing system, such as a social networking system, a CRM database system, and/or information exchange system such as those described above in the context of FIGS. 1-8, "Permission sets" generally refer to groups of permissions that may be assigned to users of such a computing environment. For instance, the assignments of users and permission sets may be stored in one or more databases of System 916. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 916 may provide on-demand database service to user systems 912 using an MTS arrangement. By way of example, one tenant organization may be a company that employs a sales force where each salesperson uses system 916 to manage their sales process. Thus, a user in such an organization may maintain contact data, leads data, customer follow-up data, performance data, goals and progress data, etc., all applicable to that user's personal sales process (e.g., in tenant data storage 922). In this arrangement, a user may manage his or her sales efforts and cycles from a variety of devices, since relevant data and applications to interact with (e.g., access, view, modify, report, transmit, calculate, etc.) such data may be maintained and accessed by any user system 912 having network access.

When implemented in an MTS arrangement, system 916 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 916 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 916 may also maintain system-level data usable by multiple tenants or other data. Such system-level data may include industry reports, news, postings, and the like that are sharable between tenant organizations.

In some implementations, user systems 912 may be client systems communicating with application servers 950 to request and update system-level and tenant-level data from system 916. By way of example, user systems 912 may send one or more queries requesting data of a database maintained in tenant data storage 922 and/or system data storage 924. An application server 950 of system 916 may automatically generate one or more SQL statements (e.g., one or more SQL queries) that are designed to access the requested data. System data storage 924 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

Figure 10A:
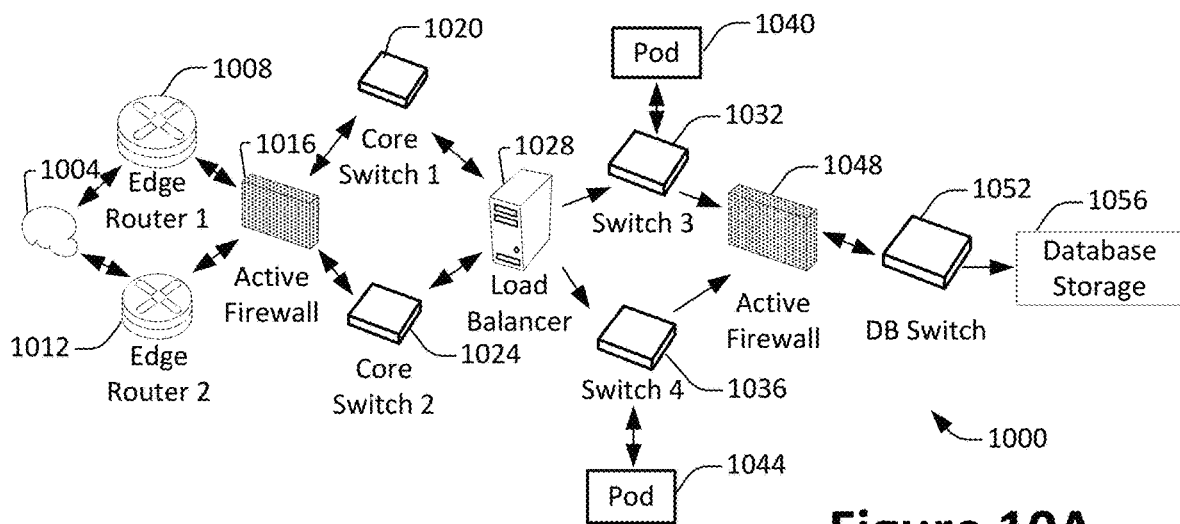
FIG. 10A shows a system diagram of an example of architectural components of an on-demand database service environment, configured in accordance with some implementations.

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers, FIG. 10A shows a system diagram of an example of architectural components of an on-demand database service environment 1000, configured in accordance with some implementations. A client machine located in the cloud 1004 may communicate with the on-demand database service environment via one or more edge routers 1008 and 1012. A client machine may include any of the examples of user systems 912 described above. The edge routers 1008 and 1012 may communicate with one or more core switches 1020 and 1024 via firewall 1016. The core switches may communicate with a load balancer 1028, which may distribute server load over different pods, such as the pods 1040 and 1044 by communication via pod switches 1032 and 1036. The pods 1040 and 1044, which may each include one or more servers and/or other computing resources, may perform data processing and other operations used to provide on-demand services. Components of the environment may communicate with a database storage 1056 via a database firewall 1048 and a database switch 1052.

Accessing an on-demand database service environment may involve communications transmitted among a variety of different components. The environment 1000 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 10A and 10B.

The cloud 1004 refers to any suitable data network or combination of data networks, which may include the Internet. Client machines located in the cloud 1004 may communicate with the on-demand database service environment 1000 to access services provided by the on-demand database service environment 1000. By way of example, client machines may access the on-demand database service environment 1000 to retrieve, store, edit, and/or process a variety of information such as CRM information, social networking information, and/or suggestion data or other information relating to an information exchange environment.

In some implementations, the edge routers 1008 and 1012 route packets between the cloud 1004 and other components of the on-demand database service environment 1000. The edge routers 1008 and 1012 may employ the Border Gateway Protocol (BGP). The edge routers 1008 and 1012 may maintain a table of IP networks or 'prefixes', which designate network reachability among autonomous systems on the Internet.

In one or more implementations, the firewall 1016 may protect the inner components of the environment 1000 from Internet traffic. The firewall 1016 may block, permit, or deny access to the inner components of the on-demand database service environment 1000 based upon a set of rules and/or other criteria. The firewall 1016 may act as one or more of a packet filter, an application gateway, a stateful filter, a proxy server, or any other type of firewall.

In some implementations, the core switches 1020 and 1024 may be high-capacity switches that transfer packets within the environment 1000. The core switches 1020 and 1024 may be configured as network bridges that quickly route data between different components within the on-demand database service environment. The use of two or more core switches 1020 and 1024 may provide redundancy and/or reduced latency.

In some implementations, communication between the pods 1040 and 1044 may be conducted via the pod switches 1032 and 1036. The pod switches 1032 and 1036 may facilitate communication between the pods 1040 and 1044 and client machines, for example via core switches 1020 and 1024. Also or alternatively, the pod switches 1032 and 1036 may facilitate communication between the pods 1040 and 1044 and the database storage 1056. The load balancer 1028 may distribute workload between the pods, which may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048, which may act as a computer application firewall operating at the database application layer of a protocol stack. The database firewall 1048 may protect the database storage 1056 from application attacks such as structure query language (SQL) injection, database rootkits, and unauthorized information disclosure. The database firewall 1048 may include a host using one or more forms of reverse proxy services to proxy traffic before passing it to a gateway router and/or may inspect the contents of database traffic and block certain content or database requests. The database firewall 1048 may work or the SQL application level atop the TCP/IP stack, managing applications' connection to the database or SQL management interfaces as well as intercepting and enforcing packets traveling to or from a database network or application interface.

In some implementations, the database storage 1056 may be an on-demand database system shared by many different organizations. The on-demand database service may employ a single-tenant approach, a multi-tenant approach, a virtualized approach, or any other type of database approach. Communication with the database storage 1056 may be conducted via the database switch 1052. The database storage 1056 may include various software components for handling database queries. Accordingly, the database switch 1052 may direct database queries transmitted by other components of the environment (e.g., the pods 1040 and 1044) to the correct components within the database storage 1056.

Figure 10B:
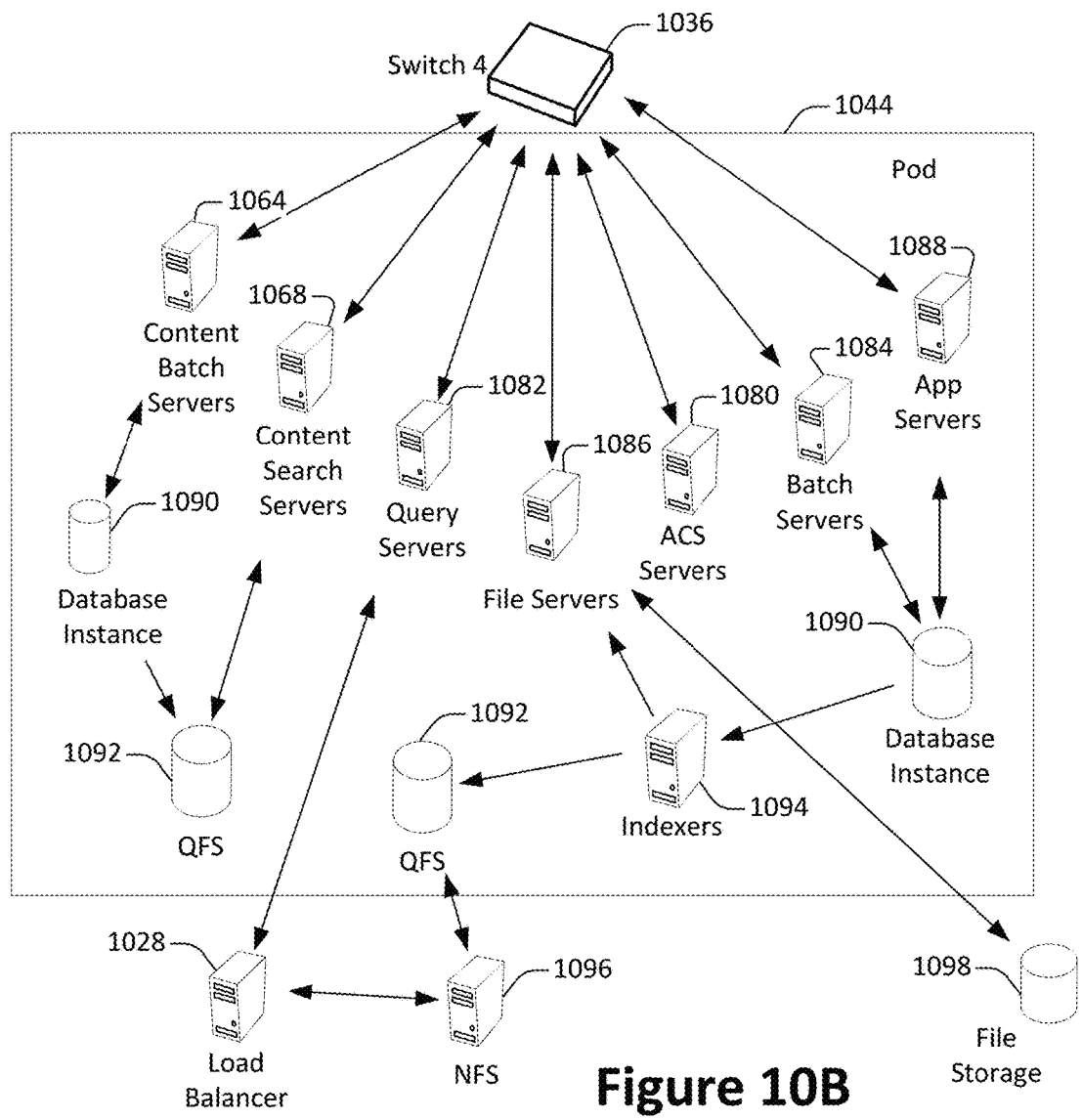
FIG. 10B shows a system diagram further illustrating an example of architectural components of an on-demand database service environment, in accordance with some implementations.

FIG. 10B shows a system diagram further illustrating an example of architectural components of an on-demand database service environment, in accordance with some implementations. The pod 1044 may be used to render services to user(s) of the on-demand database service environment 1000. The pod 1044 may include one or more content batch servers 1064, content search servers 1068, query servers 1082, file servers 1086, access control system (ACS) servers 1080, batch servers 1084, and app servers 1088. Also, the pod 1044 may include database instances 1090, quick file systems (QFS) 1092, and indexers 1094. Some or all communication between the servers in the pod 1044 may be transmitted via the switch 1036.

In some implementations, the app servers 1088 may include a framework dedicated to the execution of procedures (e.g., programs, routines, scripts) for supporting the construction of applications provided by the on-demand database service environment 1000 via the pod 1044. One or more instances of the app server 1088 may be configured to execute all or a portion of the operations of the services described herein.

In some implementations, as discussed above, the pod 1044 may include one or more database instances 1090. A database instance 1090 may be configured as an MTS in which different organizations share access to the same database, using the techniques described above. Database information may be transmitted to the indexer 1094, which may provide an index of information available in the database 1090 to file servers 1086. The QFS 1092 or other suitable filesystem may serve as a rapid-access file system for storing and accessing information available within the pod 1044. The QFS 1092 may support volume management capabilities, allowing many disks to be grouped together into a file system. The QFS 1092 may communicate with the database instances 1090, content search servers 1068 and/or indexers 1094 to identify, retrieve, move, and/or update data stored in the network file systems (NFS) 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information over a network in a manner similar to how local storage is accessed. Queries from the query servers 1022 may be transmitted to the NFS 1096 via the load balancer 1028, which may distribute resource requests over various resources available in the on-demand database service environment 1000. The NFS 1096 may also communicate with the QFS 1092 to update the information stored on the NFS 1096 and/or to provide information to the QFS 1092 for use by servers located within the pod 1044.

In some implementations, the content batch servers 1064 may handle requests internal to the pod 1044. These requests may be long-running and/or not tied to a particular customer, such as requests related to log mining, cleanup work, and maintenance tasks. The content search servers 1068 may provide query and indexer functions such as functions allowing users to search through content stored in the on-demand database service environment 1000. The file servers 1086 may manage requests for information stored in the file storage 1098, which may store information such as documents, images, basic large objects (BLOBS), etc. The query servers 1082 may be used to retrieve information from one or more file systems. For example, the query system 1082 may receive requests for information from the app servers 1088 and then transmit information queries to the NFS 1096 located outside the pod 1044. The ACS servers 1080 may control access to data, hardware resources, or software resources called upon to render services provided by the pod 1044. The batch servers 1084 may process batch jobs, which are used to run tasks at specified times. Thus, the batch servers 1084 may transmit instructions to other servers, such as the app servers 1088, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 11:
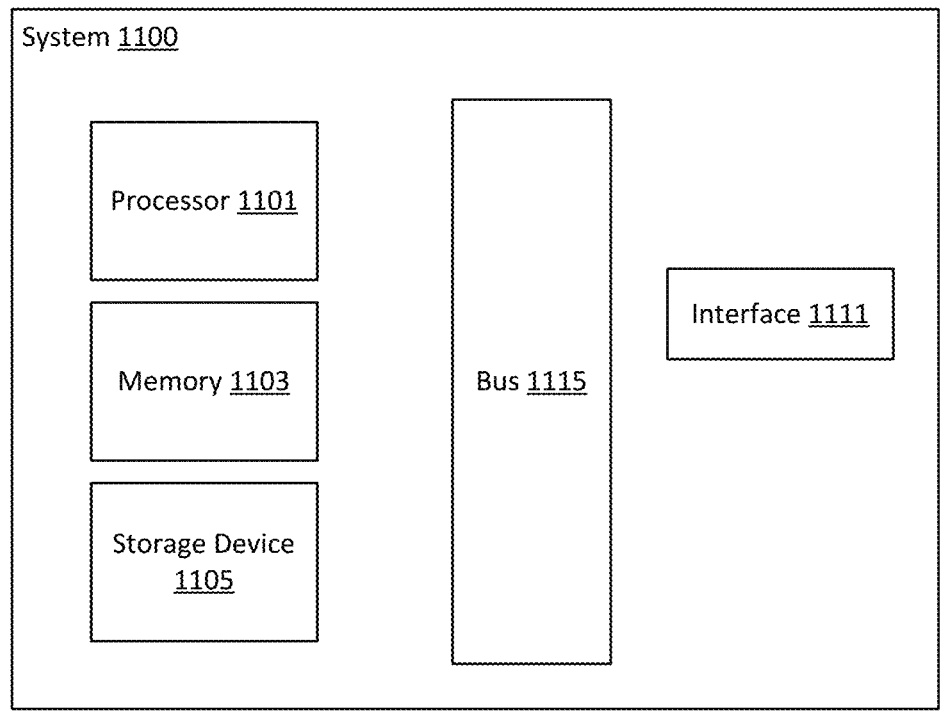
FIG. 11 illustrates one example of a computing device, configured in accordance with one or more embodiments.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a POI bus or other interconnection fabric.) System 1100 may operate as a variety of devices such as an application server, a database server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A database system implemented using a server system, the database system configurable to cause:

maintaining, using a database system, an information exchange environment, the information exchange environment configurable to allow users of an application or service to exchange suggestion data with product development entities associated with the application or service, the suggestion data comprising suggestions related to the application or service;

processing a request, from a first user of the application or service, to submit first suggestion data related to the application or service;

responsive to processing the request, displaying, on a device of the first user, a user interface of the application or service;

prompting the first user to select a region of the user interface, the region including a plurality of features, wherein the plurality of features are associated with the first suggestion data;

responsive to the first user selecting the region of the user interface, determining that there is an ambiguity resulting from the selecting;

upon determining the ambiguity, analyzing a plurality of heuristics data to determine a first feature among the plurality of features in the region;

classifying, based on the region of the user interface containing a dynamically generated user interface element identifier associated with the first feature of the application or service and a set of actions taken by the first user to navigate to a page associated with the region, the first suggestion data as being associated with the first feature; and providing, based on the classification of the first suggestion data, the first suggestion data to a first product development entity associated with the first feature.

2. The database system of claim 1, wherein classification of the first suggestion data is further based on heuristics associated with the first user, the heuristics including one or both of: a page location associated with a page viewed by the first user when providing the first suggestion data or licenses associated with the first user.

3. The database system of claim 1, the database system further configurable to cause:
determining, based on a status of the first suggestion data, that the first suggestion data has met a first milestone;
notifying, responsive to determining that the first suggestion data has met the first milestone, the first user that the first suggestion data has met the first milestone.

4. The database system of claim 1, the database system further configurable to cause:
determining that the first user has interacted with the first feature of the application or service; and
prompting, responsive to determining that the first user has interacted with the first feature of the application or service, the first user to participate in research associated with the first feature of the application or service.

5. The database system of claim 1, the database system further configurable to cause:
processing vote data from a plurality of users of the application or service, the vote data indicating user preferences related to the first suggestion data; and
displaying, on the device of the first user, an indicator of the vote data.

6. The database system of claim 5, wherein:
the information exchange environment is configurable to allow each user to submit a limited amount of suggestion data; and
the information exchange environment is configurable to allow each user submit a limited number of votes related to suggestion data.

7. The database system of claim 1, wherein the application or service comprises a customer relationship management (CRM) platform and/or a social networking system provided to a plurality of tenant organizations via an on-demand computing environment.

8. A method comprising:
maintaining, using a database system, an information exchange environment, the information exchange environment configurable to allow users of an application or service to exchange suggestion data with product development entities associated with the application or service, the suggestion data comprising suggestions related to the application or service;

processing a request, from a first user of the application or service, to submit first suggestion data related to the application or service;

responsive to processing the request, displaying, on a device of the first user, a user interface of the application or service;

prompting the first user to select a region of the user interface, the region including a plurality of features, wherein the plurality of features are associated with the first suggestion data;

responsive to the first user selecting the region of the user interface, determining that there is an ambiguity resulting from the selecting;

upon determining the ambiguity, analyzing a plurality of heuristics data to determine a first feature among the plurality of features in the region;

classifying, based on the region of the user interface containing a dynamically generated user interface element identifier associated with the first feature of the application or service and a set of actions taken by the first user to navigate to a page associated with the region, the first suggestion data as being associated with the first feature; and providing, based on the classification of the first suggestion data, the first suggestion data to a first product development entity associated with the first feature.

9. The method of claim 8, wherein classification of the first suggestion data is further based on heuristics associated with the first user, the heuristics including one or both of: a page location associated with a page viewed by the first user when providing the first suggestion data or licenses associated with the first user.

10. The method of claim 8, the method further comprising:
determining, based on a status of the first suggestion data, that the first suggestion data has met a first milestone;
notifying, responsive to determining that the first suggestion data has met the first milestone, the first user that the first suggestion data has met the first milestone.

11. The method of claim 8, the method further comprising:
determining that the first user has interacted with the first feature of the application or service; and
prompting, responsive to determining that the first user has interacted with the first feature of the application or service, the first user to participate in research associated with the first feature of the application or service.

12. The method of claim 8, the method further comprising:
- processing vote data from a plurality of users of the application or service, the vote data indicating user preferences related to the first suggestion data; and
- displaying, on the device of the first user, an indicator of the vote data.

13. The method of claim 12, wherein:
- the information exchange environment is configurable to allow each user to submit a limited amount of suggestion data; and
- the information exchange environment is configurable to allow each user submit a limited number of votes related to suggestion data.

14. The method of claim 8, wherein the application or service comprises a customer relationship management (CRM) platform and/or a social networking system provided to a plurality of tenant organizations via an on-demand computing environment.

15. A non-transitory computer-readable storage medium storing instructions to cause a processor to execute a method, the method comprising:
- maintaining, using a database system, an information exchange environment, the information exchange environment configurable to allow users of an application or service to exchange suggestion data with product development entities associated with the application or service, the suggestion data comprising suggestions related to the application or service;
- processing a request, from a first user of the application or service, to submit first suggestion data related to the application or service;
- responsive to processing the request, displaying, on a device of the first user, a user interface of the application or service;
- prompting the first user to select a region of the user interface, the region including a plurality of features, wherein the plurality of features are associated with the first suggestion data;
- responsive to the first user selecting the region of the user interface, determining that there is an ambiguity resulting from the selecting;
- upon determining the ambiguity, analyzing a plurality of heuristics data to determine a first feature among the plurality of features in the region;
- classifying, based on the region of the user interface containing a dynamically generated user interface element identifier associated with the first feature of the application or service and a set of actions taken by the first user to navigate to a page associated with the region, the first suggestion data as being associated with the first feature; and
- providing, based on the classification of the first suggestion data, the first suggestion data to a first product development entity associated with the first feature.

16. The non-transitory computer readable storage medium of claim 15, wherein classification of the first suggestion data is further based on heuristics associated with the first user, the heuristics including one or both of: a page location associated with a page viewed by the first user when providing the first suggestion data or licenses associated with the first user.

17. The non-transitory computer readable storage medium of claim 15, the instructions further configurable to cause:
- determining, based on a status of the first suggestion data, that the first suggestion data has met a first milestone;
- notifying, responsive to determining that the first suggestion data has met the first milestone, the first user that the first suggestion data has met the first milestone.

18. The non-transitory computer readable storage medium of claim 15, the instructions further configurable to cause:
- determining that the first user has interacted with the first feature of the application or service; and
- prompting, responsive to determining that the first user has interacted with the first feature of the application or service, the first user to participate in research associated with the first feature of the application or service.

19. The non-transitory computer readable storage medium of claim 15, the instructions further configurable to cause:
- processing vote data from a plurality of users of the application or service, the vote data indicating user preferences related to the first suggestion data; and
- displaying, on the device of the first user, an indicator of the vote data.

* * * * *